(12) United States Patent
Englert

(10) Patent No.: US 9,206,857 B2
(45) Date of Patent: Dec. 8, 2015

(54) COMPENSATING COUPLING FOR TRANSMITTING TORQUES

(71) Applicant: Thomas Englert, Grossostheim (DE)

(72) Inventor: Thomas Englert, Grossostheim (DE)

(73) Assignee: RINGFEDER POWER-TRANSMISSION GMBH, Gross-Umstadt (DE)

( * ) Notice: Subject to any disclaimer, the term of this patent is extended or adjusted under 35 U.S.C. 154(b) by 0 days.

(21) Appl. No.: 14/345,898

(22) PCT Filed: Oct. 4, 2012

(86) PCT No.: PCT/EP2012/069619
§ 371 (c)(1),
(2) Date: Mar. 19, 2014

(87) PCT Pub. No.: WO2013/050469
PCT Pub. Date: Apr. 11, 2013

(65) Prior Publication Data
US 2014/0228132 A1    Aug. 14, 2014

(30) Foreign Application Priority Data
Oct. 7, 2011    (DE) .......................... 10 2011 115095

(51) Int. Cl.
*F16D 3/74* (2006.01)
*B23P 17/00* (2006.01)

(52) U.S. Cl.
CPC ............. *F16D 3/74* (2013.01); *Y10T 29/49993* (2015.01)

(58) Field of Classification Search
USPC .......... 464/78–80, 87, 88, 106, 147; 403/223; 267/181; 29/530, 896.9
See application file for complete search history.

(56) References Cited

U.S. PATENT DOCUMENTS

| 1,557,958 | A | * | 10/1925 | Anderson | ........................ 464/78 |
| 3,150,506 | A | * | 9/1964 | Alcaro | .............. 464/78 |
| 3,156,106 | A | * | 11/1964 | Crane | ................ 464/78 |
| 3,263,446 | A | * | 8/1966 | Wiggins, Jr. | .................... 464/79 |
| 4,576,772 | A | * | 3/1986 | Carpenter | ..................... 264/154 |

(Continued)

FOREIGN PATENT DOCUMENTS

| DE | 3320605 A | 12/1984 |
| DE | 19939510 A | 1/2001 |

(Continued)

OTHER PUBLICATIONS

"Thermoplastics—Elastomers." Darcoid. Oct. 13, 2010, [online], [retrieved on May 11, 2014]. Retrieved from the Internet. <URL: http://www.darcoid.com/images/uploads/pdfs/Fluid%20Power%20Sealing%20Materials%20(Thermoplastics%20-%20Elastomers).pdf>.*

(Continued)

*Primary Examiner* — Josh Skroupa
(74) *Attorney, Agent, or Firm* — Andrew Wilford

(57) ABSTRACT

A compensating torque-transmitting coupling has a tubular base body extending in a longitudinal direction along a center axis and formed in one piece of an intermediate region and a pair of end regions longitudinally flanking the intermediate region. The intermediate region is of greater inside diameter and smaller outside diameter than the end regions and is formed with a plurality of angularly spaced transversely extending slots also spaced in the longitudinal direction. The slots each extend radially from an outer surface to an inner surface of the tubular base body. An elastomeric body filling each of the transverse slots.

13 Claims, 2 Drawing Sheets

(56) References Cited

U.S. PATENT DOCUMENTS

| | | | | |
|---|---|---|---|---|
| 4,858,897 | A | * | 8/1989 | Irifune .......................... 464/78 |
| 5,062,619 | A | * | 11/1991 | Sato .............................. 464/78 |
| 5,160,121 | A | * | 11/1992 | Bartholomew ............... 267/181 |
| 5,167,582 | A | * | 12/1992 | Hunt .............................. 464/78 |
| 5,510,070 | A | * | 4/1996 | Krause et al. ................. 264/156 |
| 6,640,911 | B2 | | 11/2003 | Lieser |

FOREIGN PATENT DOCUMENTS

| | | |
|---|---|---|
| EP | 0318669 A | 6/1989 |
| FR | 2271452 A | 12/1975 |

OTHER PUBLICATIONS

Translation of DE 33 20 605. "Deformation element and process for the manufacture thereof." Schaab, Karl Heinz. Dec. 13, 1984.*

* cited by examiner

COMPENSATING COUPLING FOR TRANSMITTING TORQUES

CROSS REFERENCE TO RELATED APPLICATIONS

This application is the US-national stage of PCT application PCT/EP2012/069619 filed 4 Oct. 2012 and claiming the priority of German patent application 102011115095.5 itself filed 7 Oct. 2011.

FIELD OF THE INVENTION

The invention relates to a compensating torque-transmitting coupling having a tubular base body extending longitudinally and having a plurality of longitudinally and angularly spaced transversely extending slots that each extend radially from an outer surface to an inner surface of the tubular base body. The compensating coupling can be intended, for example, to compensate for alignment errors of shafts it connects between a shaft and a tool, as the compensating coupling is to a certain extent elastic due to the slots so that large torques can also be transmitted thanks to the design with a continuous base body. Compared with a rigid tube, the compensating coupling can also reduce peak torque or sudden torque variations due to torsion.

BACKGROUND OF THE INVENTION

Compensating couplings with the characteristics described in the introduction are known from FR 2 271 452 and EP 0 318 669 (FIG. 9). A plurality of transversely extending slots are formed in cross-sectional planes, the transversely extending slots of successive cross-sectional planes being offset with respect to one another, by 60° in the case of three slots per plane and by 45° in the case of four slots. As a result of this offset, the compensating coupling can be uniformly deformed when rotating. On the one hand, using a solid, tubular base body makes it particularly easy to manufacture and, on the other, it enables larger torques to be transmitted.

A further compensating coupling with the characteristics described above is known from DE 199 39 510 and has a coupling body surrounded by an elastomeric material with damping characteristics. This enables vibrations and oscillations to be reduced when torque is transmitted by the coupling. The elastomeric material is subsequently fitted onto the compensating coupling in the form of a flexible tube. A simple shrink sleeve, for example, can be provided as the elastomeric material. The subsequent fitting of the elastomeric material can be carried out by simple means, the slotted, one-piece, metal base body being unchanged in its design. The known embodiment has the disadvantage that the flexible tube of elastomeric material resting on the outside can become detached from the base body and project significantly radially past the base body. An edge is therefore formed at which jamming is possible during assembly and handling. Furthermore, the damping characteristics are in need of improvement.

Object of the Invention

Against this background, the object of the present invention is to provide a compensating torque-transmitting coupling that enables improved damping of vibrations and oscillations and is distinguished by a high reliability.

SUMMARY OF THE INVENTION

Starting from a compensating coupling with the characteristics described above, according to the invention, the object is attained in that the transversely extending slots formed in the tubular base body are each filled with an elastomer. The measures described enable a very effective damping of oscillations and vibrations to be achieved without adversely affecting the advantageous functional characteristics of the compensating coupling. In contrast to the subsequent fitting of a flexible tubular elastomeric body, significantly increased manufacturing effort is required in the production. An elastomeric base substance, which is initially free-flowing in order to be introduced into the transversely extending slots and then cured, must be provided during production. Elastomers that harden, in particular by vulcanizing, during production or also, depending on the application, thermoplastic elastomers are suitable, for example when it can be ensured that the softening temperature is not exceeded during later operation of the compensating coupling. Basically, it would also be conceivable to use precut pieces of an elastomer material that are exactly matched to the size of the transversely extending slots, which, however, is also associated with a significant manufacturing effort.

The present invention is based on the recognition that, surprisingly, the damping characteristics can be very significantly improved as a result of the additional effort during manufacture. As a result of filling the transversely extending slots, no more free spaces, which can be set into oscillation, remain. In particular, on the whole, support is provided over a very large area by the elastomeric material, thus enabling oscillation and vibration energy to be dissipated very efficiently.

The elastomer is preferably relatively hard and has a hardness between 70 Shore A and 95 Shore A. The use of such an elastomer is advantageous, as very large forces can be exerted on the compensating coupling due to the solid design, so that an adequately stiff support between the slots is then provided in order to reduce oscillation and vibration efficiently.

Polyurethane elastomers in particular are suitable as elastomers. An example of a preferred material is the polyurethane-based elastomer plastic from Bayer AG marketed under the brand name Vulkollan. In particular, it is of advantage when the elastomer used, like Vulkollan, with a hardness between 70 Shore A and 95 Shore A can still be machined after installation.

In order to be able to retain the elastomer securely in the transversely extending slots under all circumstances, it advantageous when the elastomer projects from the slots on the inside and/or the outside of the base body and extends there axially beyond the respective slot. As a result of such an embodiment, an interlocking connection is achieved between the elastomer and the respective slot, as a result of which the elastomer is fixed. It is therefore conceivable that, for each slot, the elastomer has a thickening at the end, thus permanently guaranteeing an arrangement that is secure from working loose.

It is also possible that a layer of elastomer, which covers a plurality of slots and, together with the elastomer in the slots, forms a cohesive elastomer body, is provided on the inside and/or the outside of the base body. A cohesive elastomer body for a plurality of slots ensures that the elastomer cannot detach from the base body under any circumstances, even under extreme conditions. Particularly preferred is an embodiment in which the elastomer body covers the associated slots on the inside and the outside, thus achieving a particularly close and complete connection between the transversely extending slots and the elastomeric material. Furthermore, the transversely extending slots are protected by the elastomer from contamination, corrosion and the like both on the inside and on the outside and are invisible to a user.

Viewed in the axial direction, that is parallel to an center axis of the tubular base body, the compensating coupling usually has connecting collars without slots at the ends. The region with the transversely extending slots is then between these end connecting collars. If the compensating coupling has an increased length, a plurality of regions with transversely extending slots separated from one another by intermediate regions without slots can also be provided between the connecting collars.

The compensating coupling is usually produced starting from a thick-walled tube or even starting from a rod-shaped solid material that is first formed into a tube by producing an internal passage. In both cases, the base body is formed in one piece of metal and not from a multiplicity of assembled or subsequently connected individual parts, which results in a particularly high resistance to breaking and easy manufacture.

The arrangement according to the invention of elastomer within the transversely extending slots can be implemented with a base body that corresponds to a conventional compensating coupling in its design. According to a particularly preferred embodiment of the invention however, the base body is also modified and adapted to suit the fitting of the elastomer. If, for example, according to its usual design, the base body has at least one region provided with slots between two regions without slots one after the other in the longitudinal direction, the region provided with slots can have a larger inside diameter and/or a smaller outside diameter than the regions without slots. The region provided with transversely extending slots is therefore inset on the inside and/or on the outside with respect to the regions without slots. This makes it possible for this set-back region to be provided with elastomer in such a way that, in the region provided with transversely extending slots, the base body together with the elastomer has the same inside diameter and outside diameter as the adjacent regions without slots. A cylindrical, stepless inner surface and outer surface of the compensating coupling can therefore be achieved in spite of the arrangement of the elastomer. This avoids edges that constitute possible weak points during operation or assembly. The elastomer, that does not project on the inside or on the outside with respect to the regions without slots, is optimally protected. A stepless design is also advantageous for assembly, for example when the compensating coupling is pushed through an opening, or when shafts, feed cables or the like are pushed through the inside of the compensating coupling.

Within the framework of the invention, the transversely extending slots can have different shapes. It is therefore possible for the transversely extending slots to have the shape of simple ring segments that subtend the same angular range on the inside and the outside of the base body. However, it is disadvantageous that the production of such transversely extending slots is comparatively elaborate, so that the web remaining between the slots becomes narrower toward the inside. Particularly preferred is an embodiment in which the transversely extending slots are circularly arcuate recesses. Circularly arcuate recesses can be produced particularly easily. Circularly arcuate recesses are not only longer on their outside than on their inside, but also span a larger angular range on the outside than on the inside. Webs with a width that remains approximately constant radially can therefore be formed between the slots, which is advantageous with regard to the function of the compensating coupling.

To enable the compensating coupling to deform uniformly when transmitting torque, a plurality of cross-sectional planes, each having at least two transversely extending slots, are usually provided, wherein the transversely extending slots of a first group of cross-sectional planes are arranged offset with respect to the transversely extending slots of a second group of cross-sectional planes viewed in the circumferential direction. Particularly preferred is an embodiment in which the cross-sectional planes each have three slots distributed angularly uniformly with a pitch of 120°, wherein the transversely extending slots of the first group are offset angularly by 60° with respect to the transversely extending slots of the second group.

With a compensating coupling of the kind described on which the present invention is based, the width of the transversely extending slots is usually between 1 mm and 5 mm. The width must be chosen such that, on the one hand, the compensating coupling is sufficiently stable to transmit the torque to be expected and, on the other, is sufficiently elastic to be deformed to a sufficient extent. Within the framework of the invention, at the same time, it must be taken into account that the whole compensating coupling becomes stiffer to a certain extent due to the arrangement of the elastomer in the transversely extending slots, on account of which, with otherwise similar specifications, the width of the transversely extending slots may have to be adjusted.

The compensating coupling usually has at least twelve slots, and the number of transversely extending slots can also be increased at will by elongating the compensating coupling appropriately. The wall thickness of the compensating coupling can be between 10 mm and 50 mm for example. If, according to a preferred embodiment of the invention, the region or regions provided with transversely extending slots have a groove-shaped depression relative to the adjacent regions without slots on the inside and/or the outside, then this groove-shaped depression must be sufficiently deep to be able to accommodate a continuous sufficiently solid elastomer layer. The depth of the groove is therefore preferably at least 1 mm.

The subject of the invention is also a method for producing the compensating coupling described above, wherein a tube section is supplied, the transversely extending slots are formed in the tube section to produce the multi-slotted base body, connecting collars are produced at the ends of the tube, and the transversely extending slots are filled with an elastomer. In the course of production, an annular groove, which, together with the transversely extending slots is subsequently filled with the elastomer, is preferably also formed on the inside and/or the outside in the region of a plurality of transversely extending slots.

BRIEF DESCRIPTION OF THE DRAWING

The invention is described below with reference to a drawing that shows just one illustrated embodiment. In the drawing.

SPECIFIC DESCRIPTION OF THE INVENTION

Figure 1:
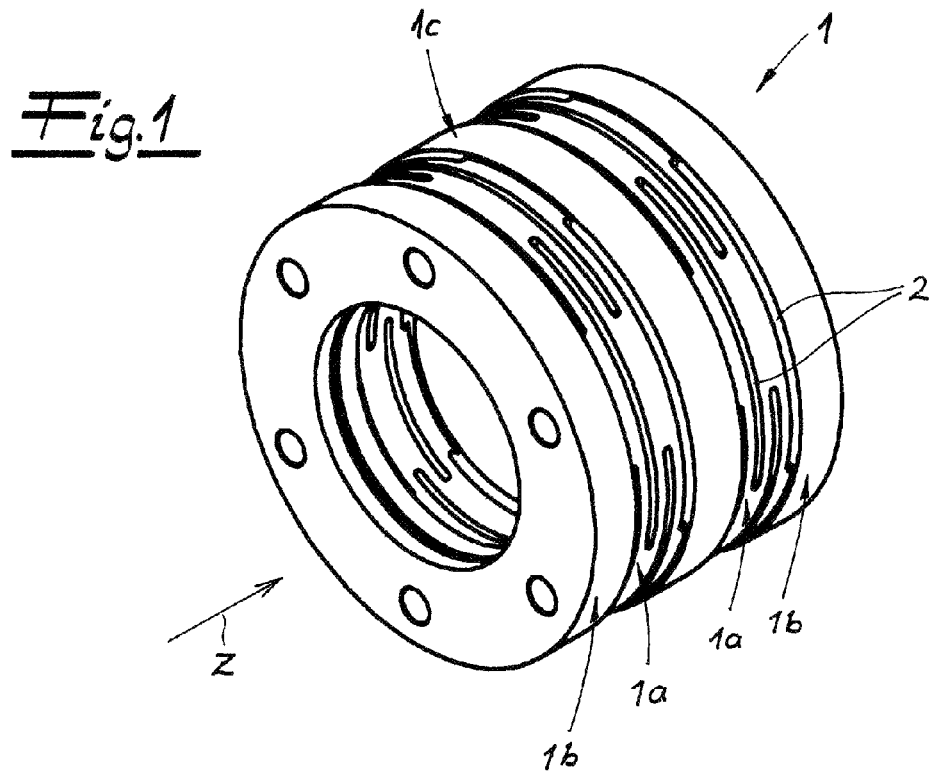
FIG. 1 is a perspective view of a base body of a compensating coupling.

FIG. 1 shows only the base body 1 of the compensating coupling according to the invention that is made from a one-piece metallic tube. In a manner that is known per se, the base body 1 has a multiplicity of transversely extending slots 2 that are spaced in a longitudinal direction z as well as angularly.

FIG. 1 further shows that the transverse slots 2 extend from an outer surface to an inner surface of the tubular base body 1. The transverse slots 2 enable the coupling to compensate to a certain extent for alignment errors of shafts connected to one another, when connecting a shaft to a tool or similar. Furthermore, shocks in the form of torque peaks can also be reduced by torsion of the base body. However, since the base body is formed from a one-piece metal part, very high stability and a long service life can be achieved.

The base body 1 usually has at least one region 1a that is provided with transverse slots 2 between two connecting collars or end regions 1b. In the illustrated embodiment, two such regions 1a, which are provided with transverse slots 2 and which are separated by an intermediate region 1c without slots, are provided.

It can already be seen from FIG. 1 that the regions 1a provided with transverse slots 2 are slightly radially inset relative to the adjacent end regions 1b, 1c.

Figure 2:
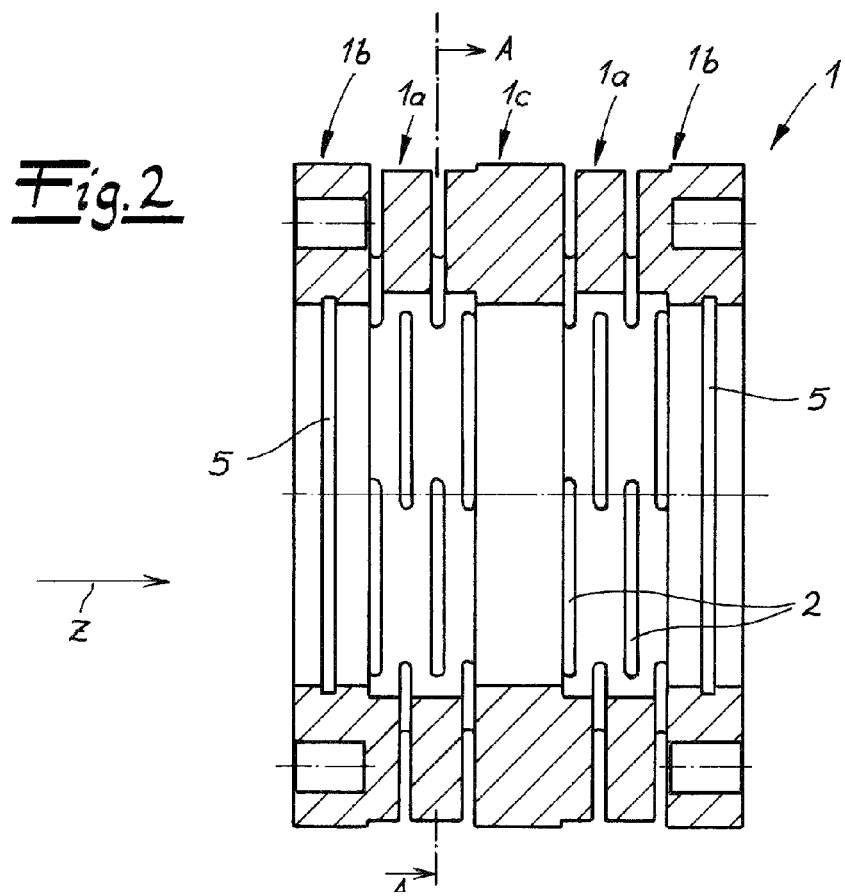
FIG. 2 is a longitudinal section through the base body according to FIG. 1.
Figure 3:
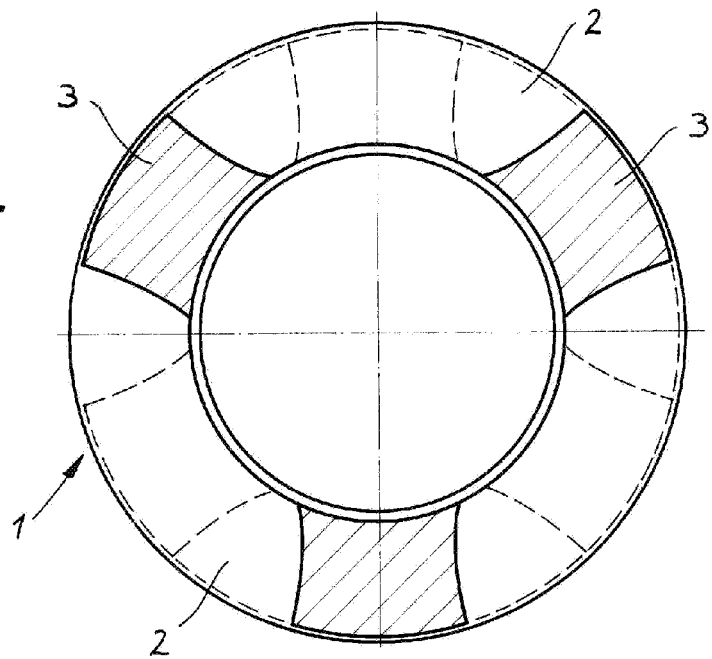
FIG. 3 is a section along line A-A of FIG. 2.

It can be seen from a comparative consideration of FIGS. 1 and 2 that the regions 1a provided with transversely extending slots 2 each are formed in each of four cross-sectional planes with three transverse slots 2. FIG. 3 shows the base body 1 in one of these cross-sectional planes, showing that the transverse slots 2 are circularly arcuate recesses. The transverse slots 2 can therefore be cut particularly easily with a disk. As a result of this shape of the transverse slots 2, webs 3, which have an approximately constant width radially, can be formed between the transverse slots 2.

The next cross-sectional plane with its transverse slots 2 following in the longitudinal direction Z is also shown in FIG. 3. It can be seen that the transverse slots 2 of adjacent cross-sectional planes are staggered with respect to one another by exactly 60°, so that the transverse slots 2 of the one cross-sectional plane lie in the region of the webs 3 of the adjacent cross-sectional plane.

Figure 4:
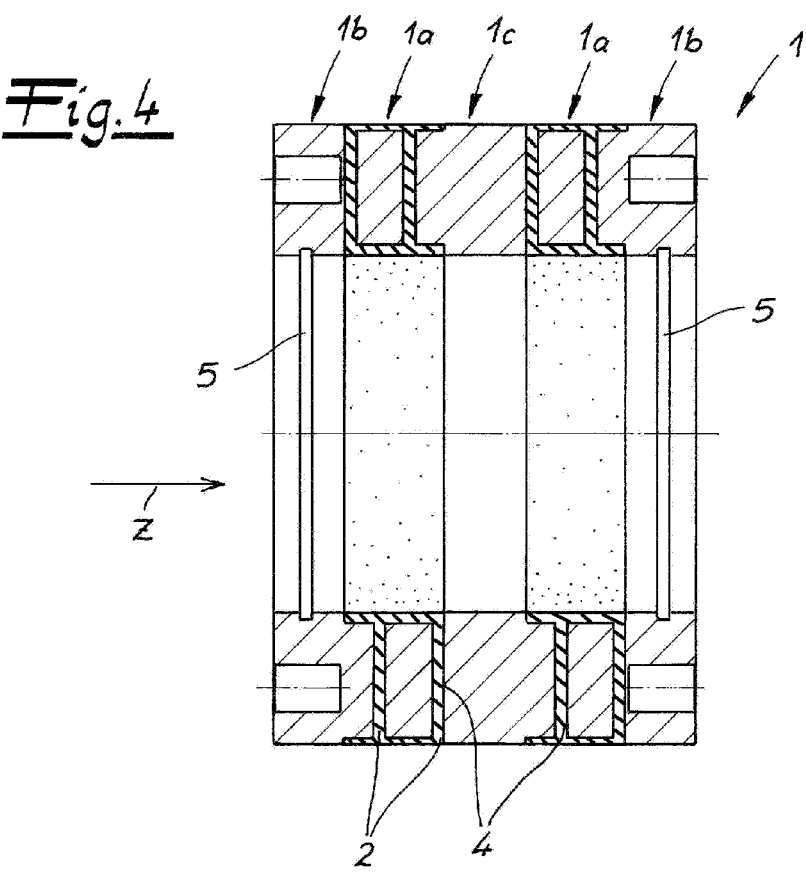
FIG. 4 shows an embodiment according to the invention of the compensating coupling with the base body according to FIG. 2 and with an elastomer.

Finally, FIG. 4 shows the complete compensating coupling in which the transverse slots 2 are filled with elastomer 4. According to the particularly preferred embodiment shown, the elastomer 4 also extends out of the transverse slots 2 on the inside and the outside of the base body 1, thus forming an outer jacket and an inner jacket formed by the elastomer 4. As can be seen in FIGS. 2 and 4, the base body 1 has a larger inside diameter and a smaller outside diameter in the region provided with the transverse slots 2 than the adjacent regions 1b, 1c without slots. An elastomer body that tightly bonds to the transverse slots 2 and attaches flush to the regions without slots, that is to say one of the end regions 1b and the intermediate region 1c, can therefore be formed from the elastomer 4. The embodiment described results in a cylindrical ring shape of the compensating coupling, with an internal groove 5 for inserting a locking ring only in the two connecting collars 1b.

The invention claimed is:

1. A compensating torque-transmitting coupling comprising:
a tubular base body extending in a longitudinal direction along a center axis and formed in one piece of an intermediate region and a pair of end regions longitudinally flanking the intermediate region, the intermediate region being of greater inside diameter and smaller outside diameter than the end regions and being formed with a plurality of angularly spaced transversely extending slots also spaced in the longitudinal direction, the transverse slots each extending radially from an outer surface to an inner surface of the tubular base body; and
an elastomeric body filling each of the transverse slots.

2. The compensating coupling as claimed in claim 1, wherein the elastomeric body projects out of the transverse slots on the inside and/or the outside of the base body and extends there in longitudinally beyond the associated transverse slot.

3. The compensating coupling as claimed in claim 2, wherein the body includes a layer of elastomer that covers a plurality of the transverse slots and, together with the elastomeric body in the transverse slots, forms a cohesive elastomeric body, is provided on the inside and/or the outside of the base body.

4. The compensating coupling as claimed in claim 3, wherein the elastomeric body covers the associated transverse slots on the inside and the outside of the base body.

5. The compensating coupling as claimed in claim 1, wherein, in the intermediate region, the elastomeric body has the same inside diameter and outside diameter as the end regions.

6. The compensating coupling as claimed in claim 1, wherein the base body is formed in one piece of metal.

7. The compensating coupling as claimed in claim 1, wherein the transverse slots are circularly arcuate recesses.

8. The compensating coupling as claimed in claim 1, wherein in each of a plurality of longitudinally spaced cross-sectional planes, the intermediate region is formed with at least two of the transverse slots, the transverse slots of each of the planes being angularly offset with respect to the transverse slots of the adjacent cross-sectional planes.

9. The compensating coupling as claimed in claim 8, wherein in each of the cross-sectional planes there are three of the transverse slots distributed angularly uniformly, the transverse slots of each plane being offset angularly by 60° with respect to the transverse slots of the adjacent planes.

10. The compensating coupling as claimed in claim 1, wherein the elastomeric body has a hardness between 70 Shore A and 95 Shore A.

11. The compensating coupling as claimed in claim 1, wherein the elastomeric body is of polyurethane.

12. A method for producing a compensating coupling having a tubular base body extending in a longitudinal direction and having a plurality of angularly spaced transversely extending slots also spaced in the longitudinal direction, the transverse slots each extending radially from an outer surface to an inner surface of the tubular base body, the method comprising the steps of:
supplying a tube section extending along an axis and having a pair of end regions and an intermediate region therebetween,
forming the intermediate region to have a smaller outside diameter and a larger outside diameter than the end regions,
forming the transverse slots in the intermediate region to produce the multi-slotted base body, and
filling the transverse slots and covering inner and outer surfaces of the intermediate region with an elastomer such that inner and outer surfaces formed by the elastomer covering the intermediate region are of the same diameter as respective inner and outer surfaces of the end regions.

13. The compensating coupling defined in claim 1, wherein the slots define webs extending radially between the inner and outer surface of the intermediate region and angularly separating the slots from one another.

* * * * *